United States Patent
Hunkins et al.

(10) Patent No.: US 9,449,359 B2
(45) Date of Patent: Sep. 20, 2016

(54) RENDERING SETTINGS IN A MULTI-GRAPHICS PROCESSING UNIT SYSTEM

(75) Inventors: James D. Hunkins, Toronto (CA); Dennis K. W. Au, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 485 days.

(21) Appl. No.: 13/613,218

(22) Filed: Sep. 13, 2012

(65) Prior Publication Data

US 2014/0071141 A1    Mar. 13, 2014

(51) Int. Cl.
*G06T 1/00*    (2006.01)
*G06T 1/20*    (2006.01)

(52) U.S. Cl.
CPC ..................... *G06T 1/20* (2013.01)

(58) Field of Classification Search
None
See application file for complete search history.

(56) References Cited

U.S. PATENT DOCUMENTS

| | | | | |
|---|---|---|---|---|
| 6,075,768 | A * | 6/2000 | Mishra | 370/229 |
| 6,247,161 | B1 * | 6/2001 | Lambrecht | G06F 17/5054 710/316 |
| 6,894,973 | B1 * | 5/2005 | Mishra | 370/229 |
| 7,526,593 | B2 | 4/2009 | Mandal et al. | |
| 7,539,809 | B2 * | 5/2009 | Juenger | 710/307 |
| 7,616,206 | B1 | 11/2009 | Danilak | |
| 8,010,682 | B2 * | 8/2011 | Barrett et al. | 709/228 |
| 8,345,052 | B1 * | 1/2013 | Diard | 345/502 |
| 2003/0028694 | A1 * | 2/2003 | Aboulenein | G06F 13/4031 710/107 |
| 2004/0236532 | A1 * | 11/2004 | Wheless et al. | 702/120 |
| 2004/0236534 | A1 * | 11/2004 | Wheless et al. | 702/127 |
| 2005/0147307 | A1 * | 7/2005 | Kitamura | 382/238 |
| 2007/0067508 | A1 * | 3/2007 | Chai et al. | 710/33 |
| 2007/0268829 | A1 * | 11/2007 | Corwin et al. | 370/235 |
| 2008/0025347 | A1 * | 1/2008 | Mantegna et al. | 370/516 |
| 2008/0068389 | A1 | 3/2008 | Bakalash et al. | |
| 2008/0158248 | A1 * | 7/2008 | Nishioka et al. | 345/606 |
| 2008/0162951 | A1 * | 7/2008 | Kenkare et al. | 713/300 |
| 2008/0304738 | A1 | 12/2008 | Beilloin | |
| 2010/0008572 | A1 * | 1/2010 | Koduri et al. | 382/166 |
| 2011/0063308 | A1 | 3/2011 | Hunkins et al. | |
| 2011/0134132 | A1 * | 6/2011 | Wolf | 345/502 |
| 2011/0148923 | A1 * | 6/2011 | Sadowski et al. | 345/634 |
| 2011/0210976 | A1 * | 9/2011 | Diard | 345/522 |
| 2011/0276688 | A1 * | 11/2011 | Qian et al. | 709/224 |
| 2012/0042110 | A1 * | 2/2012 | Nakazono et al. | 710/305 |
| 2012/0105452 | A1 * | 5/2012 | Diard | G06T 3/40 345/428 |
| 2012/0166598 | A1 * | 6/2012 | Yuan | H04L 41/12 709/220 |
| 2012/0246368 | A1 * | 9/2012 | Kwon et al. | 710/110 |
| 2013/0179711 | A1 | 7/2013 | Aelion et al. | |
| 2013/0336229 | A1 * | 12/2013 | Kakadia et al. | 370/329 |
| 2014/0006822 | A1 * | 1/2014 | Diab et al. | 713/322 |
| 2014/0223211 | A1 * | 8/2014 | Ries | G06F 1/206 713/322 |

OTHER PUBLICATIONS

Akenine-Moller et al., "Graphics Processing Units for Handhelds," Proceedings of the IEEE, vol. 96, No. 5, May 2008 (pp. 779-789).

* cited by examiner

*Primary Examiner* — William Beutel
(74) *Attorney, Agent, or Firm* — Volpe and Koenig, P.C.

(57) ABSTRACT

Graphics rendering settings in a computer system are adjusted when an activity level on a bus meets a trigger condition. The graphics rendering settings of the system are returned to a previous level when the bus activity drops below a threshold. The trigger condition may be related to bandwidth usage on the bus or latency of data sent over the bus.

24 Claims, 9 Drawing Sheets

RENDERING SETTINGS IN A MULTI-GRAPHICS PROCESSING UNIT SYSTEM

FIELD OF THE INVENTION

The present invention is generally directed to graphics processing, and in particular, to adjusting graphics processing settings to allow for higher quality settings at higher frame rates, when supportable by the graphics system, while dynamically adjusting the rendering quality as needed to maintain the desired frame rates.

BACKGROUND

A user can adjust the initial display settings for an application that uses graphics processing (for example, rendered simulations or games). For example with games, this process currently involves trial and error, in which the user adjusts the settings and then has to play the game to determine whether those settings result in a desired display quality and display frame rate. If the display quality is not desirable (for example, the frame rate stalls), the user then needs to manually adjust the settings. Based on these adjustments, the user's selected settings generally do not stress the available hardware. Retaining smooth motion in the game (for example, so there is no frame rate stalling) means that a lower image quality sequence is displayed.

Multi-graphics processing unit (GPU) rendering systems require a certain amount of bus bandwidth to work properly, wherein a bus includes various types of communication fabrics including point-to-point protocols. Such systems work with an assumed maximum bus latency to help compensate for bus traffic issues related to available bandwidth and bus conflicts. If the bus usage exceeds the system's expected levels, different types of visible issues will become pronounced. It is noted that multiple GPUs can physically exist in multiple semiconductor packages, a single package with multiple semiconductor dies, or a single package with a single semiconductor die.

Because most graphics-intense software varies in how much rendering is required to display updated frames over time (i.e., variable frame rates and bus usage), the rendering settings normally attempt to minimize such bus-caused errors and visible issues. This results in lower frame rates and/or lower rendering quality.

Some multi-GPU rendering systems also use small buffer sizes to reduce system cost. But a small buffer leaves the system more vulnerable to potential latency issues. These cases are even more dependent on ensuring quality by maintaining a worst-case lower frame rate/rendering quality.

At times when the system is not heavily loaded, resources are left idle which could be used to produce faster (i.e., smoother) frame rates and/or improved graphics quality/reality. Because the system settings are normally preset, the worst-case scenario is normally assumed, to ensure a consistent viewing experience.

The existing solutions do not sufficiently address these problems. In one known solution, the frame rate is restricted to be low enough or some rendering settings are restricted to avoid frame failures. This results in less smooth display updates than other solutions or provides a lower quality display. Such restrictions result in less pleasing rendering results and could impact the immersion level in games or accuracy of simulations.

A second known solution is to use more memory for a larger frame buffer to avoid frame failures. This solution is expensive and power-hungry, and may also require more memory than is available in the system. For systems already installed with limited frame buffers, there is normally no option to increase the amount of memory.

A third known solution is to allow for some frame failures and supply a "recovery" mode, which will cause a visible disruption to the image during the frame error time period (of one or more frames). One method in this solution is to display the last "good" frame, resulting in tearing of part or all of the image. Another method in this solution is to allow the failure (visible in failed frames) and perform a recovery on each frame until the failure no longer happens. Either of these methods results in more disruptions to the image when the settings are not optimized to prevent frame errors.

SUMMARY OF EXEMPLARY EMBODIMENTS

Predictive error detection may be performed by monitoring different indicators that can help forecast potential "frame errors." As the potential error state is approached and errors start or become more frequent, the side effects or corrections will be more visible to the user. When the indicators reach a predetermined threshold, the system dynamically modifies different graphics settings to decrease the rendering and bus loading to prevent error cases with a small decrease of quality, which will be less noticeable than the error side effects. When the indicators indicate a decrease in the rendering and/or bus loading, the settings are adjusted to increase quality, which may include adjusting the settings so that they are restored to their earlier desired quality levels.

A method for adjusting graphics rendering settings in a computer system monitors an activity level on a bus. The graphics rendering settings of the system are adjusted when the bus activity meets a trigger condition. The graphics rendering settings of the system are returned to a previous level when the bus activity drops below a threshold.

A system for adjusting graphics rendering settings in a computer system includes a graphics processing unit (GPU), a frame buffer associated with the GPU, and a graphics driver in communication with the GPU and the frame buffer. The graphics driver is configured to monitor an activity level on a bus, adjust the graphics rendering settings of the system when the bus activity meets a trigger condition, and return the graphics rendering settings of the system to a previous level when the bus activity drops below a threshold.

A non-transitory computer-readable storage medium storing a set of instructions for execution by a general purpose computer to adjust graphics rendering settings in a computer system includes a monitoring code segment for monitoring an activity level on a bus, an adjusting code segment for adjusting the graphics rendering settings of the system when the bus activity meets a trigger condition, and a returning code segment for increasing the graphics rendering settings of the system when the bus activity drops below a threshold.

BRIEF DESCRIPTION OF THE DRAWINGS

A more detailed understanding may be had from the following description, given by way of example in conjunction with the accompanying drawings, wherein.

DETAILED DESCRIPTION

A computer system may be configured to run at a faster default frame rate, automatically detect when processing is beginning to slow down (back up), reduce some capabilities to maintain a smooth frame rate, and then return the capabilities to their original settings when processing has returned to normal levels. By automatically adjusting the settings as needed, the system may run at a faster frame rate and/or a higher quality than normal, with the results being transparent to the user. The application settings may be automatically checked and adjusted, without feedback to the user or intervention by the user.

Figure 1:
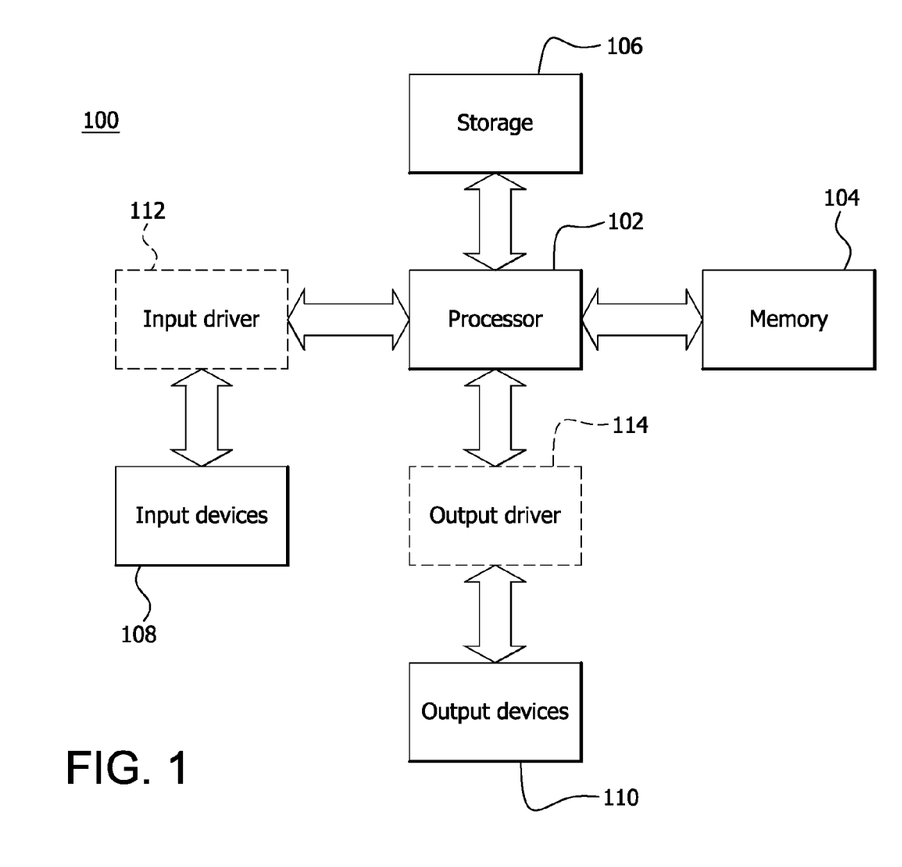
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
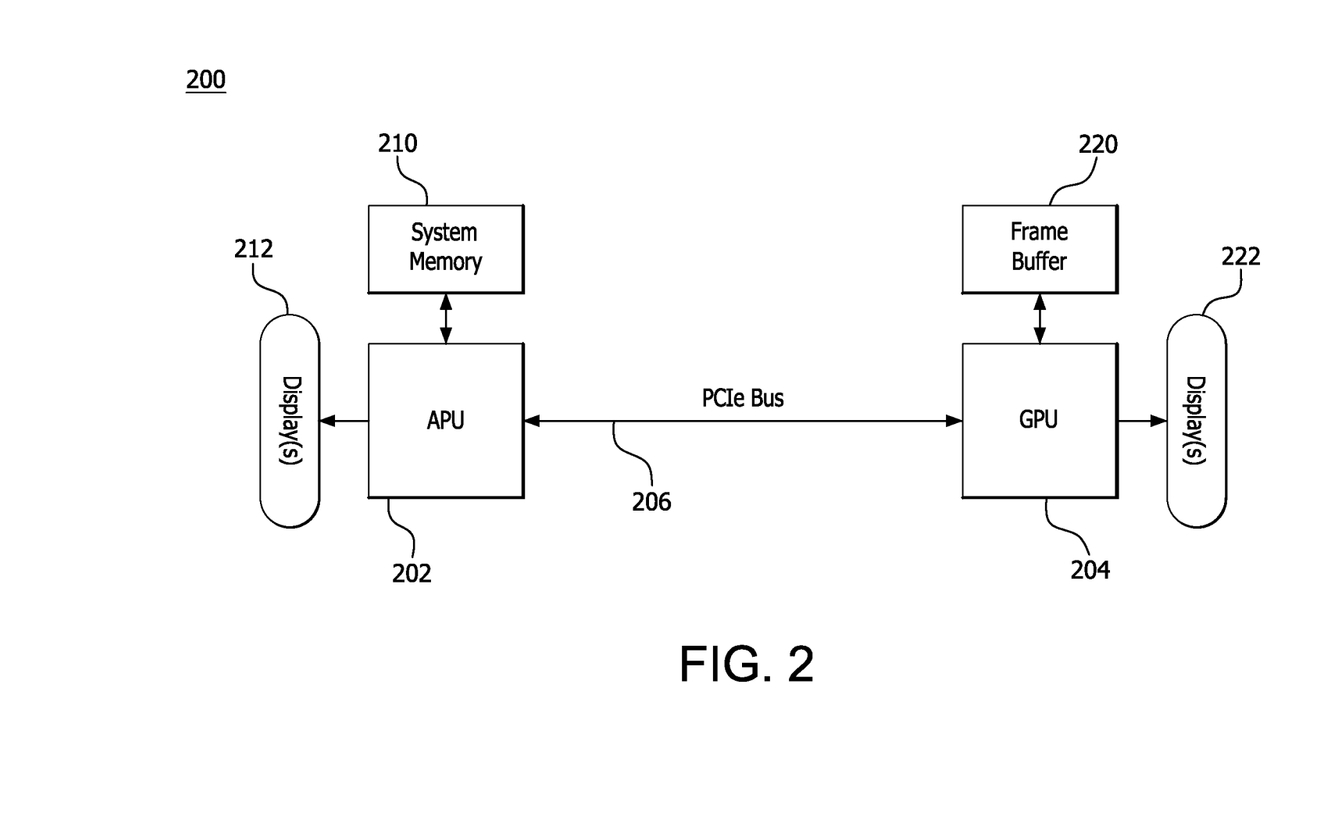
FIG. 2 is a block diagram of an example system including one accelerated processing unit (APU) and one graphics processing unit (GPU)

FIG. 2 is a block diagram of an example system 200 including one accelerated processing unit (APU) 202 and one graphics processing unit (GPU) 204 connected by a Peripheral Component Interconnect Express (PCIe) bus 206. The APU 202 communicates with a system memory 210 and is capable of sending information to one or more displays 212 for display to a user. The GPU 204 communicates with a frame buffer memory 220 and is capable of sending information to one or more displays 222 for display to the user.

Figure 3:
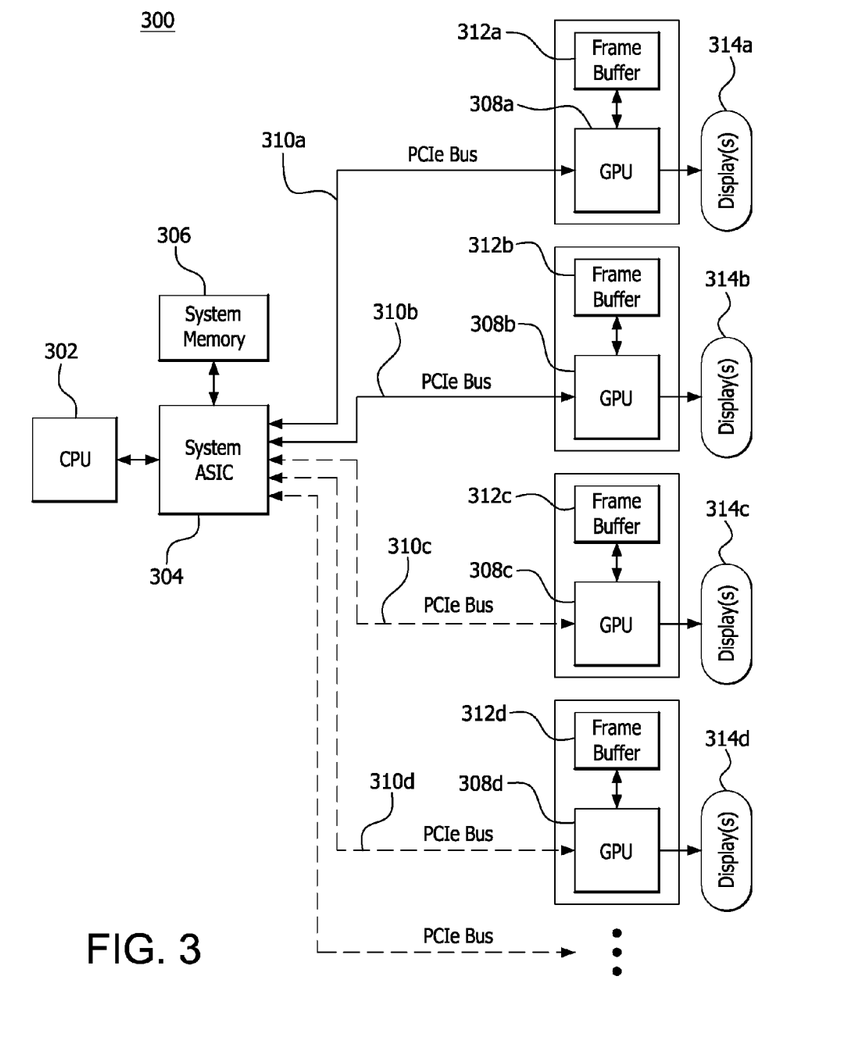
FIG. 3 is a block diagram of an example system including one central processing unit (CPU) and multiple GPUs.

FIG. 3 is a block diagram of an example system 300 including one central processing unit (CPU) 302 and multiple GPUs 308. The CPU 302 communicates with a system application-specific integrated circuit (ASIC) 304. The system ASIC 304 communicates with a system memory 306 and each of the GPUs 308 via a separate PCIe bus 310. Each GPU 308 communicates with an associated frame buffer memory 312 and is capable of sending information to one or more displays 314 for display to the user. For discussion purposes, the below description of the operation of one embodiment focuses on the system 300 having two GPUs (308a, 308b). It is noted that the operation of the embodiment is similar if the system 300 includes more than two GPUs.

Figure 4:
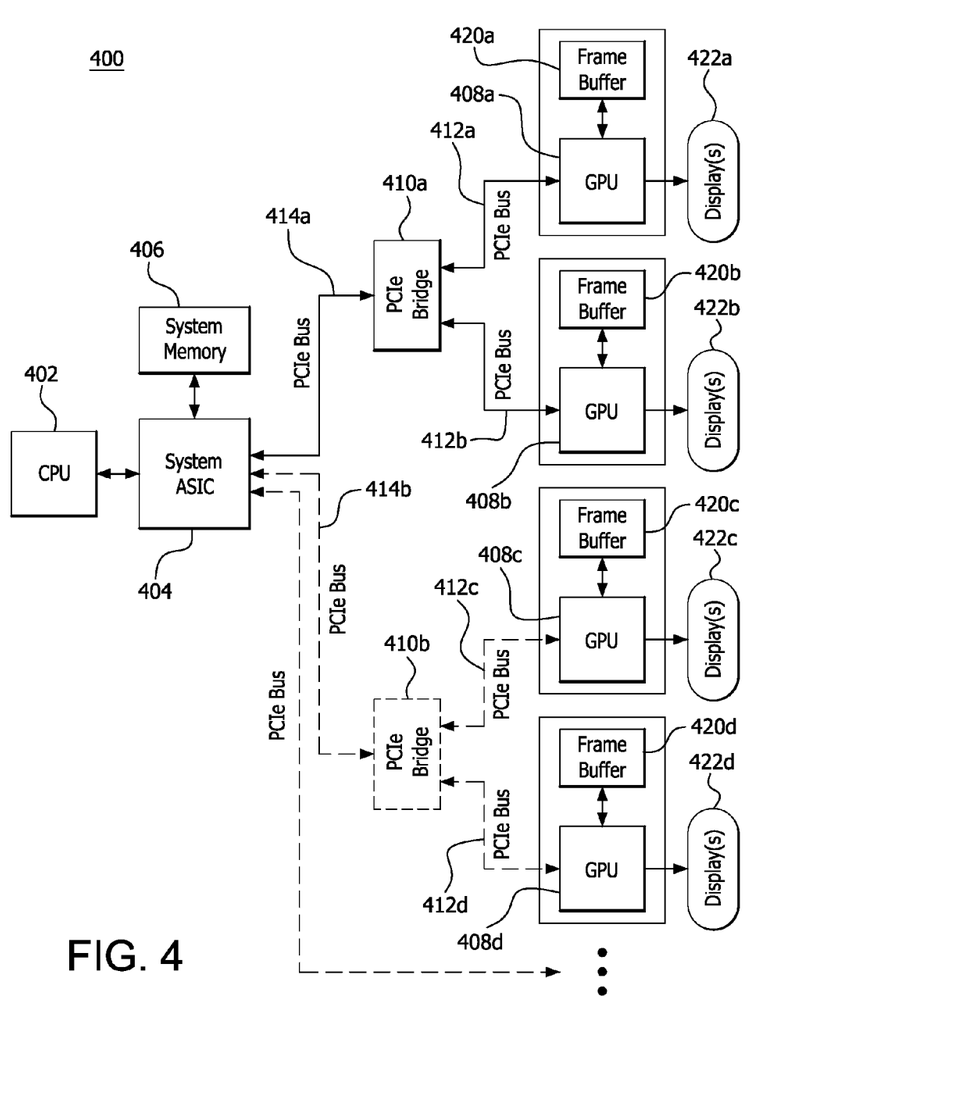
FIG. 4 is a block diagram of an example system including one CPU, multiple GPUs, and interim Peripheral Component Interconnect Express (PCIe) bridges.

FIG. 4 is a block diagram of an example system 400 including one CPU 402, multiple GPUs 408, and interim PCIe bridges 410. The CPU 402 communicates with a system ASIC 404. The system ASIC 404 communicates with a system memory 406 and each of the GPUs 408 via the PCIe bridge 410 and PCIe bus segments 412, 414. Each GPU 408 communicates with an associated frame buffer memory 420 and is capable of sending information to one or more displays 422 for display to the user. For discussion purposes, the below description of the operation of one embodiment focuses on the system 400 having two GPUs (408a, 408b). It is noted that the operation of the embodiment is similar if the system 400 includes more than two GPUs.

With current systems (for example, systems 200, 300, 400), it is possible to determine when frame rate stalling or other types of system slow-down may occur. The system 200, 300, 400 may be configured to run at a faster default frame rate, automatically detect when processing is beginning to slow down (back up), reduce some capabilities to maintain a smooth frame rate, and then return the capabilities to their original settings when processing has returned to normal levels. By automatically adjusting the settings as needed, the system may run at a faster frame rate and/or a higher quality than normal, with the results being transparent to the user. The application settings may be automatically checked and adjusted, without feedback to the user or intervention by the user.

In one alternative implementation, the user may specify a minimum frame rate and adjust the rendering settings to match the specified minimum frame rate. In a second alternative implementation, a log of the changes to the rendering settings may be maintained, whereby the user could see how frequently the rendering settings were adjusted, to enable the user to select different initial rendering settings.

Figure 5:
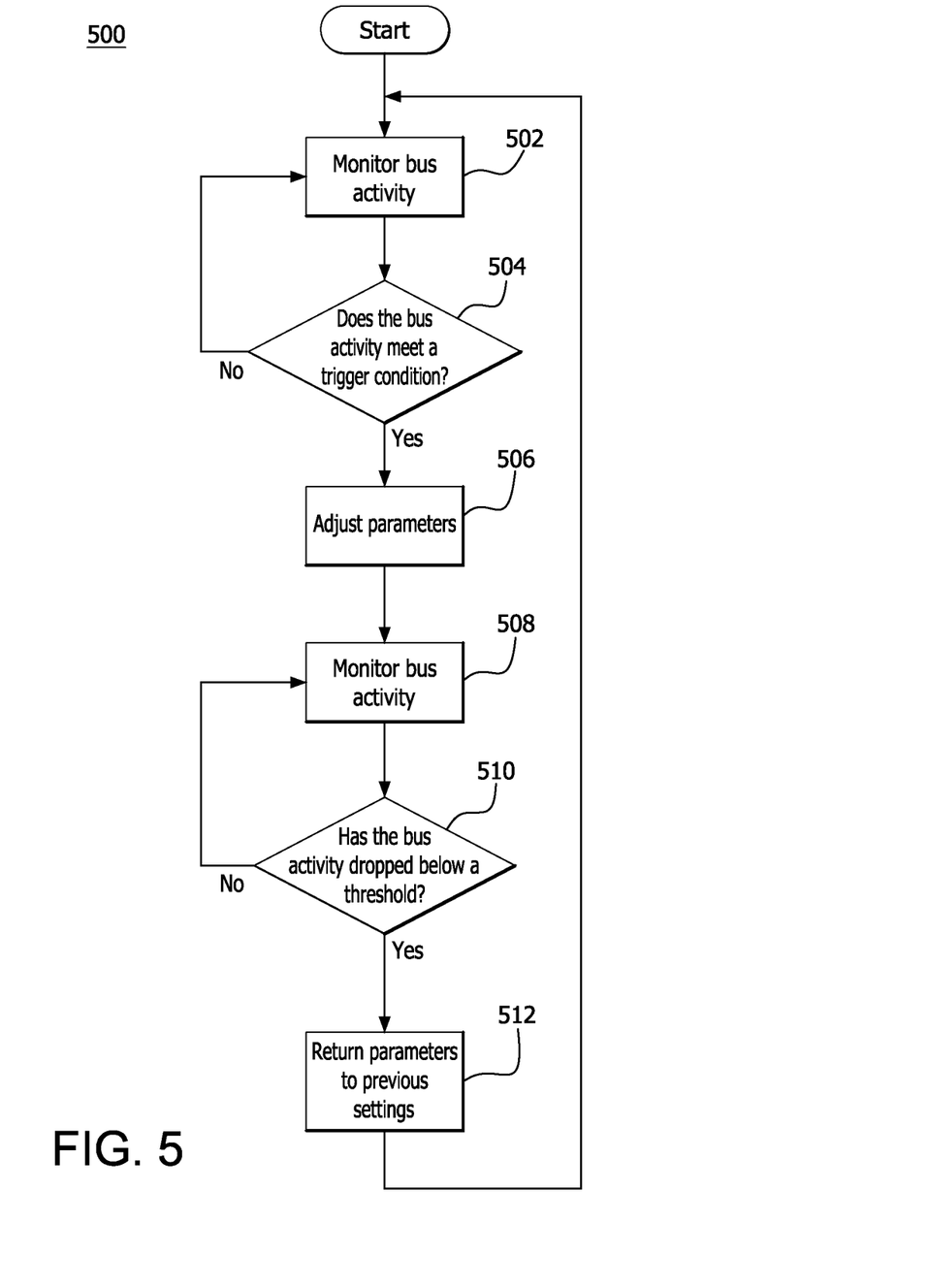
FIG. 5 is a flowchart of a method for adjusting graphics rendering settings based on a bus activity level.

FIG. 5 is a flowchart of a method 500 for adjusting graphics rendering settings based on a bus activity level. Bus activity (for example, activity on the PCIe bus) is monitored (step 502). A determination is made whether the bus activity meets a trigger condition (step 504). If there is not a high enough level of bus activity to meet the trigger condition, then the method continues to monitor the bus activity (step 502).

If the bus activity level meets the trigger condition (step 504), then the rendering parameters are adjusted (step 506). The bus activity is again monitored (step 508) and a determination is made whether the bus activity has dropped below a predetermined threshold (step 510). If the bus activity has not dropped below the predetermined threshold, then the method continues to monitor the bus activity (step 508). If the bus activity has dropped below the predetermined threshold (step 510), then the rendering parameters are returned to their previous settings (step 512). The method 500 then loops back to step 502, to continuously monitor the bus activity.

The method 500 is a dynamic process, such that the rendering parameters are adjusted (step 506) when there is a probability of a frame failure or processing slowdown (as determined by the bus activity level). Adjustments may also be made based on the application that is currently running and the system's hardware, including the amount of available memory. Different adjustments may be made if the system has a low memory size, as opposed to a system with a larger memory size. For example, some adjustments would only need to be made because of a low memory size, and would not be necessary with a large memory size.

When predicting the potential frame failure rate, either the time to fill a buffer through the PCIe bus (bus bandwidth measurement) or the latency between the request and the arrival of the first "chunk" of pixel data may be monitored. The latency may be measured as the amount of time it takes from when the image data transfer is started to when the image data arrives at the destination.

By monitoring either of these indicators, an increase in the bus activity (for example, activity on the PCIe bus) can be observed as it happens. If the bus usage by the system, graphics devices, or multi-GPU rendering requirements rises too high, it may increase the latency of the rendering system, and therefore cause frame failures. As the bus activity increases, approaching the point where the buffer could underflow (not be filled in time to start the output to the display), the graphics driver may adjust the rendering parameters to decrease the bus load and therefore avoid a resulting visible frame error.

Two mechanisms may be used for error detection (step 502 of the method 500): bandwidth measurement and latency measurement. In some cases, the bandwidth measurement mechanism may be preferred when there is more variance in the performance. The latency measurement mechanism may be preferred when there is not much variance in the performance.

It is noted that other PCIe bus counters (other than bandwidth measurement and latency measurement) may be used to indicate retry rates and other factors which could indicate bus issues. While such counters are usable, they may not be as accurate or as quick-responding as the bandwidth measurement and latency measurement mechanisms. Such other counters may also indicate other unrelated issues that may not be correctable via the methods described herein.

Lab measurements may be used to determine a starting point for different configurations and applications. The latency measurement may be used for an optimum setting of the Extended Dynamic Memory Access buffer size and underflow detection sensitivity. The bandwidth measurement may be used to check these results, confirming that the changes center around the "optimum" settings.

In gaming scenarios where scenes often change in complexity (for example, in shooter games), the latency method may be used when first turning on graphics multi-processing activity to check and set the initial settings, and then switch to the bandwidth measurement method to allow for faster measurements and response times.

In video streaming, there is a fairly consistent bandwidth usage. The latency method may be used both for the initial settings and for occasional adjustments over time. The bandwidth measurements will probably not make much of a difference in this situation, because of the more level bandwidth usage.

The bandwidth measurement method monitors how the video data flows from the rendering engine outwards. By using a bandwidth counter to time how many SCLKs (GPU clock cycles) happen from the time the first data enters the buffer until the buffer reaches a full level, the bandwidth used by the bus for all bus-related activities may be determined. A lower time indicates a lower bandwidth usage and less chance of a frame error. A higher time indicates increased bus usage and an increased chance of a frame error. If the time to fill the buffer increases too much, it will result in a buffer underflow, as the frame will need to start before the buffer is ready to send the data to the display.

Figure 6:
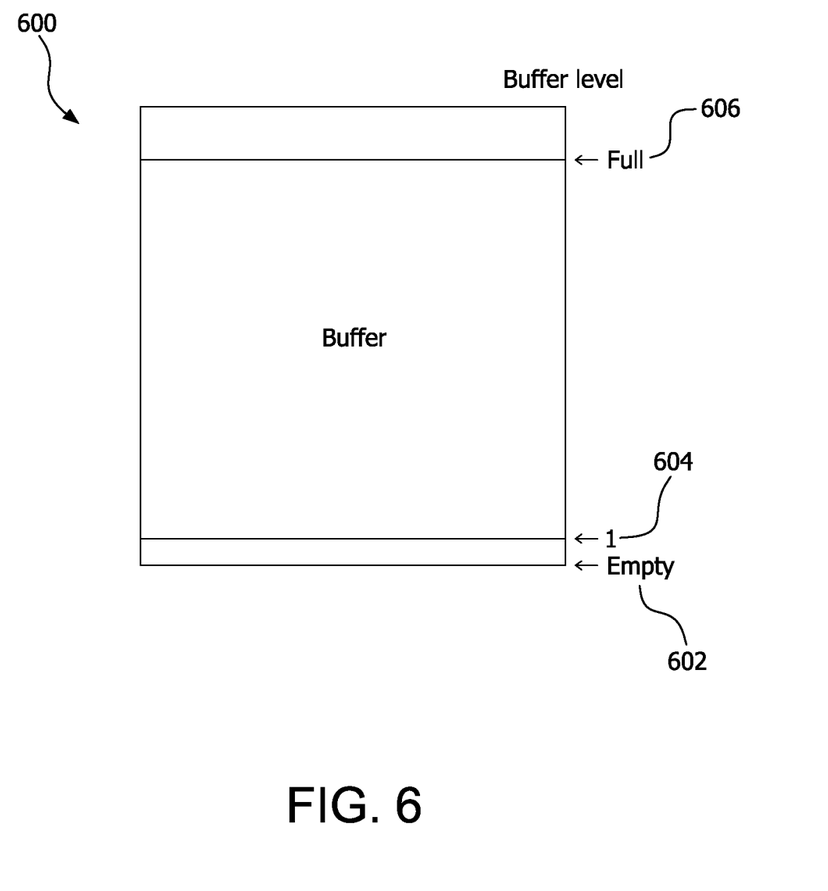
FIG. 6 is a diagram of a frame buffer showing fill levels.

If the frame buffer does not fill fast enough (meaning that the rendering engine and/or the bus are overloaded), then some capabilities will be reduced, so that the rendering engine can run faster and/or the bus has less traffic. FIG. 6 shows an example of a frame buffer 600 with different fill levels. For example, the different fill levels include an empty level 602, a single item 604 in the buffer 600, and a desired fill level 606.

The desired buffer fill level 606 may be tuned (dynamically adjusted) based on the current system status, in terms of the available hardware and the application usage requirements. A default buffer fill level 606 may be selected and then dynamically adjusted. Both the buffer fill level 606 and the application quality settings may be adjusted to achieve the desired frame rate output.

Figure 7:
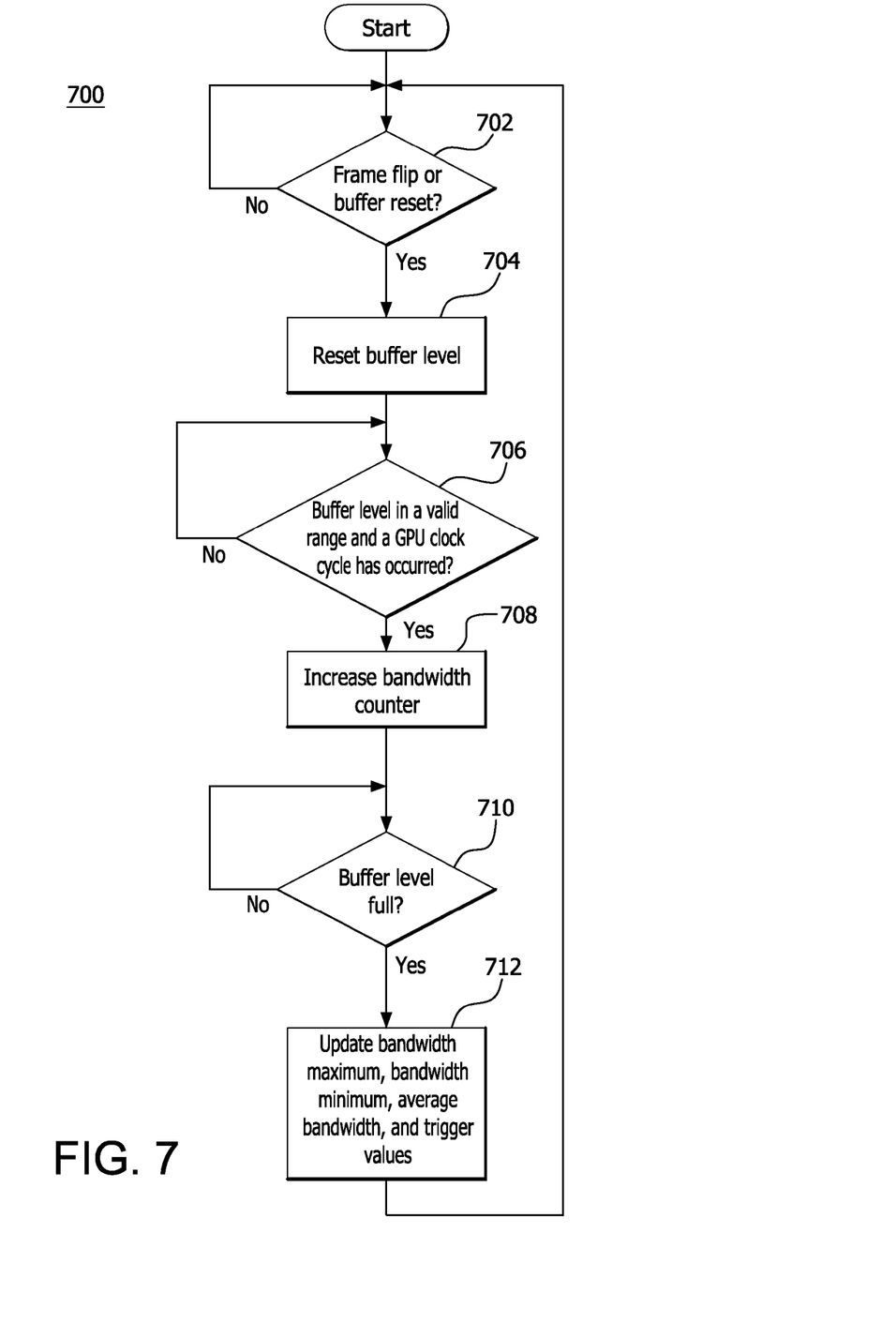
FIG. 7 is a flowchart of a bandwidth measurement method.

FIG. 7 is a flowchart of a bandwidth measurement method 700 (which may be used in step 502 of the method 500). A determination is made whether there has been a frame buffer flip or a frame buffer reset (step 702). If either the frame buffer has been flipped or the frame buffer has been reset, then the buffer level is reset (step 704). Either of these conditions results in an empty buffer, so the buffer level should be reset. While the frame buffer has not flipped and has not been reset (step 702), the system continues to monitor for either of these events (repeating step 702).

Once the buffer level has been reset (step 704), a determination is made whether the buffer fill level is in a valid range (for example, greater than or equal to one and less than full) and whether a GPU clock cycle has occurred (step 706). If both conditions are met, then the bandwidth counter is increased (step 708). If both conditions are not met (step 706), then the system continues to monitor for both of these events (repeating step 706).

After the bandwidth counter is increased, a determination is made whether the buffer fill level indicates a full buffer (step 710). If the buffer is not full, then the system continues to monitor the buffer fill level (repeating step 710). If the buffer is full, then the maximum bandwidth value, the minimum bandwidth value, the average bandwidth value, and the trigger values are updated (step 712). The method 700 then repeats by performing the determinations over again, beginning with determining whether there has been a frame buffer flip or a frame buffer reset (step 702).

The trigger value for determining whether to adjust the rendering parameters (as used in step 504 of the method 500) may be based on the maximum bandwidth value, the minimum bandwidth value, and the average bandwidth value. In general, the maximum and minimum bandwidth measurement values provide a more instant and/or short-term change of the system behavior, while the average bandwidth measurement provides a long-term and more static bandwidth measurement. The adjustment should try to maintain the bandwidth utilization at or near the predefined average bandwidth most of the time. The adjustment should also respond to the maximum/minimum bandwidth change faster, to account for the short-term bandwidth fluctuation. If the maximum bandwidth measurement is detected for some amount of time, the adjustment to the bandwidth should be conducted accordingly. If the maximum bandwidth reduces over time, the adjustment should bring the system to operate at or near the predefined average bandwidth. Hysteresis may be needed to smooth out the instantaneous adjustments from happening too frequently.

Figure 8:
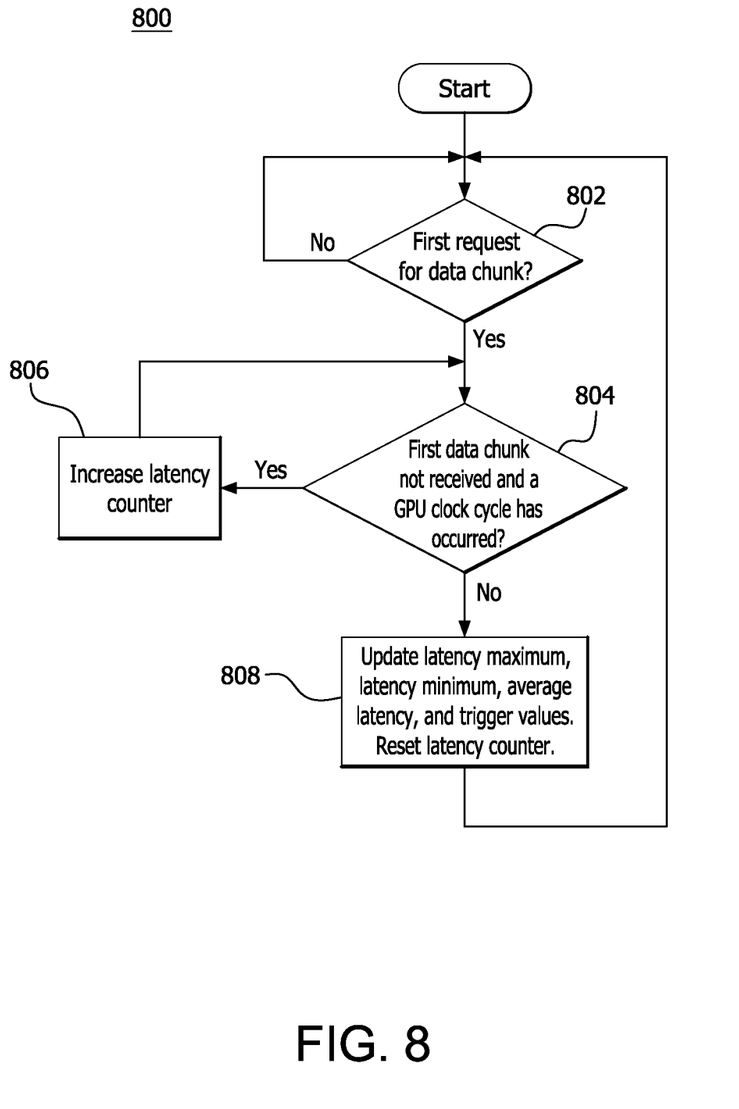
FIG. 8 is a flowchart of a latency measurement method.

FIG. 8 is a flowchart of a latency measurement method 800 (which may be used in step 502 of the method 500). A determination is made whether a request for a data chunk is the first request for the data chunk (step 802). It is noted that the term "data chunk" refers to an arbitrary size of a data request. If the first request is not made, the method waits until the request is made (repeating step 802). If the first request is made, a determination is made whether the first requested data chunk has been received and whether a GPU clock cycle has occurred (step 804). If the first requested data chunk has not been received and a GPU clock cycle has occurred, then the latency counter is increased (step 806) and the determination is repeated (step 804). Otherwise, the maximum latency value, the minimum latency value, the average latency value, and the trigger value are updated and the latency counter is reset (step 808). The method then repeats with determining whether a request for a data chunk is the first request for the data chunk (step 802).

In the latency measurement method, a latency counter may be used to measure the latency on the bus. This counter increments on every SCLK after the first request for a data "chunk" at a specific pixel location is made. Once the requested data chunk arrives, the counter stops incrementing. The lower time versus higher time has the same meaning as with the bandwidth measurement method. The latency method provides a faster first response than the bandwidth measurement method, but does not detect fluctuations during an individual buffer segment.

A frame buffer is an area of memory that holds the image data for one full screen (for example, a single monitor). The frame buffer is broken into smaller segments of memory to allow finer control. Therefore, the image can start drawing as soon as the first buffer segment is full, even though the system is still filling the remaining buffer segments for the specific frame buffer. If the buffer is not broken into segments, the system would have to wait for the entire frame buffer to fill completely before it could start displaying the image on the monitor. This buffer segment method reduces the latency from the start of the frame rendering until the image is displayed on the screen.

Another reason for segmenting the buffer is for the buffer fullness and emptiness monitoring. The data return to the buffer is out-of-order, so the traditional first-in, first-out read/write pointer base level monitoring does not work well. Segmenting the buffer simplifies monitoring the buffer fullness and emptiness, because the buffer level can be determined by the number of empty segments irrespective of the order of the segments in the buffer.

Lab testing using the bandwidth or latency counters along with maximum and minimum recordings of the counter and a frame error count may be used to determine thresholds for the trigger setting and the duration of parameter adjustment levels. An algorithm to smooth the results and avoid false triggers and too frequent adjustments may be used. There are different ways to implement the smoothing algorithm. In one example implementation, the algorithm does not respond to the first bandwidth increase, but responds to the average of several samples. The algorithm may respond on the high side or the low side, depending on prior patterns. The parameter settings would then return to the desired average. Assuming that the system indicated a return to "normal" usage, the settings would eventually be adjusted back to the starting level, possibly in steps.

Different parameter adjustment levels may be needed for different types of media. For example, high-resolution third person shooter-type games will likely have a larger and more frequent change in the bus activity level than, for example, a video playback. Therefore, different settings may be used for each situation, to better optimize the system.

Figure 9:
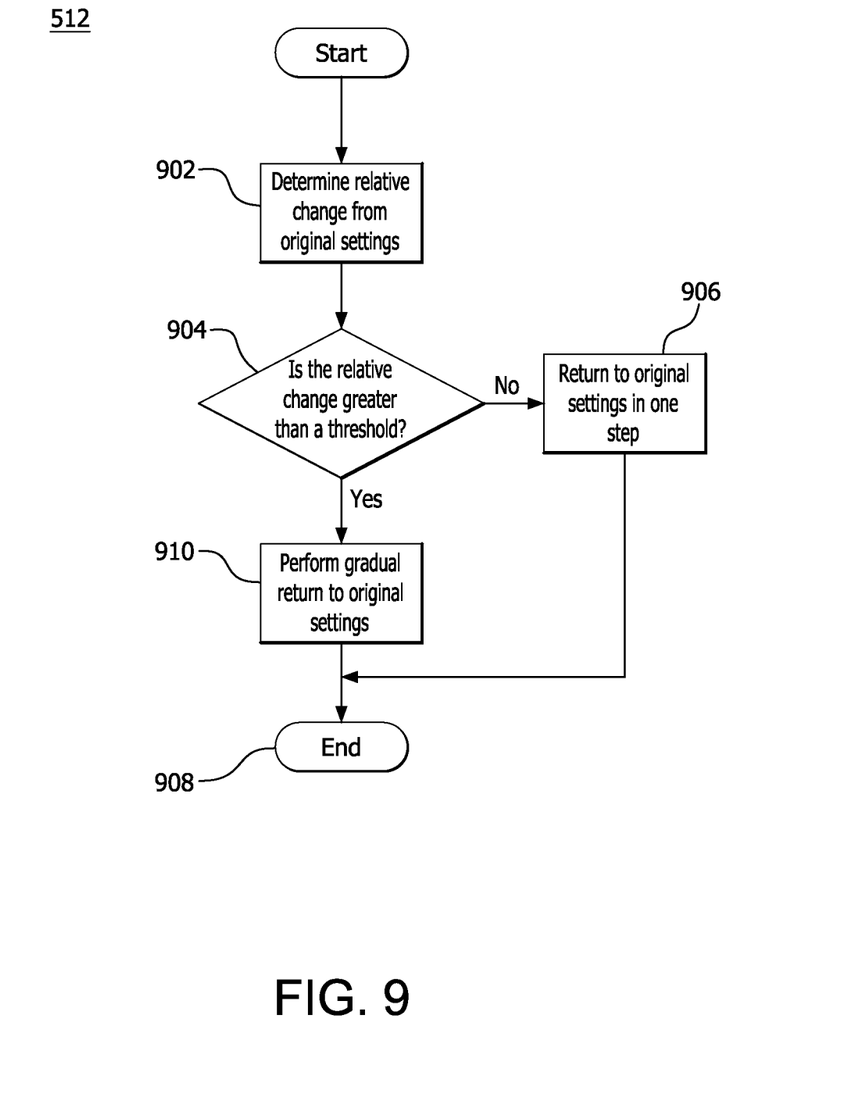
FIG. 9 is a flowchart of a method for returning the graphics rendering settings to their original values.

FIG. 9 is a flowchart of a method for returning the graphics rendering settings to their original values (step 512 of the method 500). How the graphics rendering settings are returned to their original values depends on the application running and the amount of change in the settings. The goal is to avoid presenting a visible difference to the user.

The relative change between the adjusted graphics rendering settings (step 506 of the method 500) and the original graphics rendering settings is determined (step 902). A determination is then made whether the relative change is greater than a predetermined threshold (step 904). If the relative change is less than the predetermined threshold, then the graphics rendering settings are returned to their original settings in one step (step 906) and the method terminates (step 908). If the relative change is greater than the predetermined threshold (step 904), then the graphics rendering settings are gradually returned to their original settings (step 910) and the method terminates (step 908).

Returning the graphics rendering settings from the adjusted values to the original values may be performed all at once (if the relative changes were minor) or gradually (if the relative changes were large). A gradual return to the original values is used so as to not visually disrupt the user's experience (making a large change all at once would result in a noticeable difference in the display). A smoothing algorithm may be used to determine the setting changes used to implement the gradual return. In one implementation of the smoothing algorithm, large changes may be made first, followed by successively smaller changes. The goal of the smoothing algorithm is to perform the changes in such a way that the user's visual experience is not noticeably disrupted.

Only items under control of the graphics drivers can be adjusted. Items not related to the graphics from the system side that may be using the PCIe bus, and therefore impacting the bus bandwidth/latency to the graphics system, are beyond the scope of this method. But the graphics adjustments can help compensate for non-graphics activity on the PCIe bus.

Several items may be used to decrease the PCIe bus activity and/or affect how long it takes to render new frames. The examples given here are a subset of what can be used. The type of application along with the hardware configurations of the graphics system and the main system will dictate which methods are the most effective.

Case 1: Reducing texture sizes and/or complexity may decrease the PCIe bus activity in some cases, especially for graphics systems with small frame buffers.

Case 2: Adjusting graphics rendering parameters that may cause more or less "data sharing" between GPUs (for example, GPU to GPU transfers). Some examples include super anti-aliasing, shadows, particle physics, etc.

Case 3: Limiting the frame rate will decrease the data transfers across the bus.

Case 4: Reducing the color depth or changing color formats may help in systems that support more than 24-bit ARGB (red green blue alpha) formats.

Case 5: Other physics or OpenCL™ activities that are heavy bus users may be limited or reduced in priority.

It should be understood that many variations are possible based on the disclosure herein. Although features and elements are described above in particular combinations, each feature or element may be used alone without the other features and elements or in various combinations with or without other features and elements. In one embodiment, the methods described herein are implemented in the graphics driver. Other embodiments may be envisioned in which the methods are implemented elsewhere in the system 200, 300, 400. Such other embodiments would need to communicate with the graphics driver to obtain the necessary information to perform the methods.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for adjusting graphics rendering settings in a computer system, comprising:
    monitoring an activity level on the bus, the monitoring comprising measuring a latency on the bus by:
        determining whether a request made for a data chunk is the first request for the data chunk;
        on the condition that it is determined that the request for the data chunk is the first request for the data chunk,
            (i) increasing a latency counter when the requested data chunk has not been received and a clock cycle has occurred and (ii) repeating (i) after the latency counter is increased; and
        resetting the latency counter and updating a trigger value when the requested data chunk has been received;
    adjusting the graphics rendering settings of the system from a first level to a second level when the activity level on the bus meets the trigger value; and
    returning the graphics rendering settings of the system from the second level to the first level when the bus activity level drops below a threshold.

2. The method according to claim 1, wherein the bus is a Peripheral Component Interconnect Express bus.

3. The method according to claim 1, wherein monitoring the activity level on the bus further comprises measuring bandwidth usage on the bus.

4. The method according to claim 3, wherein the monitoring includes switching between measuring the latency on the bus and measuring the bandwidth usage on the bus.

5. The method according to claim 3, wherein measuring the bandwidth usage on the bus includes:
    increasing a bandwidth counter when a frame buffer level is in a predetermined range; and
    updating a maximum bandwidth value, a minimum bandwidth value, an average bandwidth value, and a trigger value when the buffer level is full.

6. The method according to claim 5, wherein the predetermined range is greater than or equal to one and less than full.

7. The method according to claim 1, wherein the clock cycle is a graphics processing unit clock cycle and measuring the latency further includes updating a maximum latency value, a minimum latency value, an average latency value, and a trigger value when the requested data chunk has been received.

8. The method according to claim 1, wherein the trigger value is based on a maximum bandwidth value, a minimum bandwidth value, and an average bandwidth value.

9. The method according to claim 1, wherein the trigger value is based on a maximum latency value, a minimum latency value, and an average latency value.

10. The method according to claim 1, wherein the returning includes:
    returning the graphics rendering settings from the second level to the first level in one step when a relative change between the first graphics rendering settings and the second graphics rendering settings is less than a threshold; and
    gradually returning the graphics rendering settings from the second level to the first level in multiple steps when the relative change between the previous graphics rendering settings and the adjusted graphics rendering settings is greater than the threshold.

11. The method according to claim 10, wherein gradually returning the graphics rendering settings from the second level to the first level includes using a smoothing algorithm.

12. A system for adjusting graphics rendering settings in a computer system, comprising:
    a graphics processing unit (GPU);
    a frame buffer associated with the GPU; and
    a graphics driver in communication with the GPU and the frame buffer, the graphics driver configured to:
        monitor an activity level on the bus, the monitoring comprising measuring a latency on the bus by:
            determining whether a request made for a data chunk is the first request for the data chunk;

on the condition that it is determined that the request for the data chunk is the first request for the data chunk, (i) increasing a latency counter when the requested data chunk has not been received and a GPU clock cycle has occurred and (ii) repeating (i) after the latency counter is increased; and resetting the latency counter and updating a trigger value when the requested data chunk has been received;

adjust the graphics rendering settings of the system from a first level to a second level when the activity level on the bus meets the trigger value; and return the graphics rendering settings of the system from the second level to the first level when the bus activity level drops below a threshold.

13. The system according to claim 12, wherein the system includes:
a plurality of GPUs;
a plurality of frame buffers, each frame buffer associated with one of the plurality of GPUs; and
the graphics driver is in communication with each of the plurality of GPUs and each of the plurality of frame buffers.

14. The system according to claim 12, wherein the bus is a Peripheral Component Interconnect Express bus.

15. The system according to claim 12, wherein the graphics driver is further configured to:
monitor the activity level on the bus by measuring bandwidth usage on the bus.

16. The system according to claim 15, wherein the graphics driver is further configured to:
update a maximum latency value, a minimum latency value, an average latency value, and a trigger value when the requested data chunk has been received.

17. The system according to claim 15, wherein the graphics driver is further configured to:
measure the bandwidth usage on the bus;
increase a bandwidth counter when a frame buffer level is in a predetermined range; and
update a maximum bandwidth value, a minimum bandwidth value, an average bandwidth value, and a trigger value when the buffer level is full.

18. The system according to claim 17, wherein the predetermined range is greater than or equal to one and less than full.

19. The system according to claim 12, wherein the trigger value is based on a maximum bandwidth value, a minimum bandwidth value, and an average bandwidth value.

20. The system according to claim 12, wherein the trigger value is based on a maximum latency value, a minimum latency value, and an average latency value.

21. The system according to claim 12, wherein the graphics driver is further configured to:
return the graphics rendering settings from the second level to the first level in one step when a relative change between the first graphics rendering settings and the second graphics rendering settings is less than a threshold; and
gradually return the graphics rendering settings from the second level to the first level in multiple steps when the relative change between the first graphics rendering settings and the second graphics rendering settings is greater than the threshold.

22. The system according to claim 21, wherein the graphics driver is further configured to gradually return the graphics rendering settings from the second level to the first level using a smoothing algorithm.

23. A non-transitory computer-readable storage medium storing a set of instructions for execution by a general purpose computer to adjust graphics rendering settings in a computer system, the set of instructions comprising:
monitoring an activity level on the bus, the monitoring comprising measuring a latency on the bus by:
determining whether a request made for a data chunk is the first request for the data chunk;
on the condition that it is determined that the request for the data chunk is the first request for the data chunk, (i) increasing a latency counter when the requested data chunk has not been received and a clock cycle has occurred and (ii) repeating (i) after the latency counter is increased; and
resetting the latency counter and updating a trigger value when the requested data chunk has been received;
adjusting the graphics rendering settings of the system from a first level to a second level when the activity level on the bus meets a trigger value; and
returning the graphics rendering settings of the system from the second level to the first level when the bus activity level drops below a threshold.

24. The non-transitory computer-readable storage medium according to claim 23, wherein the instructions are hardware description language (HDL) instructions used for the manufacture of a device.

* * * * *